Dec. 9, 1941.                    P. SEMEL                     2,265,872
                          REPEATING PROGRAM CLOCK
                            Filed Feb. 24, 1940                2 Sheets-Sheet 1
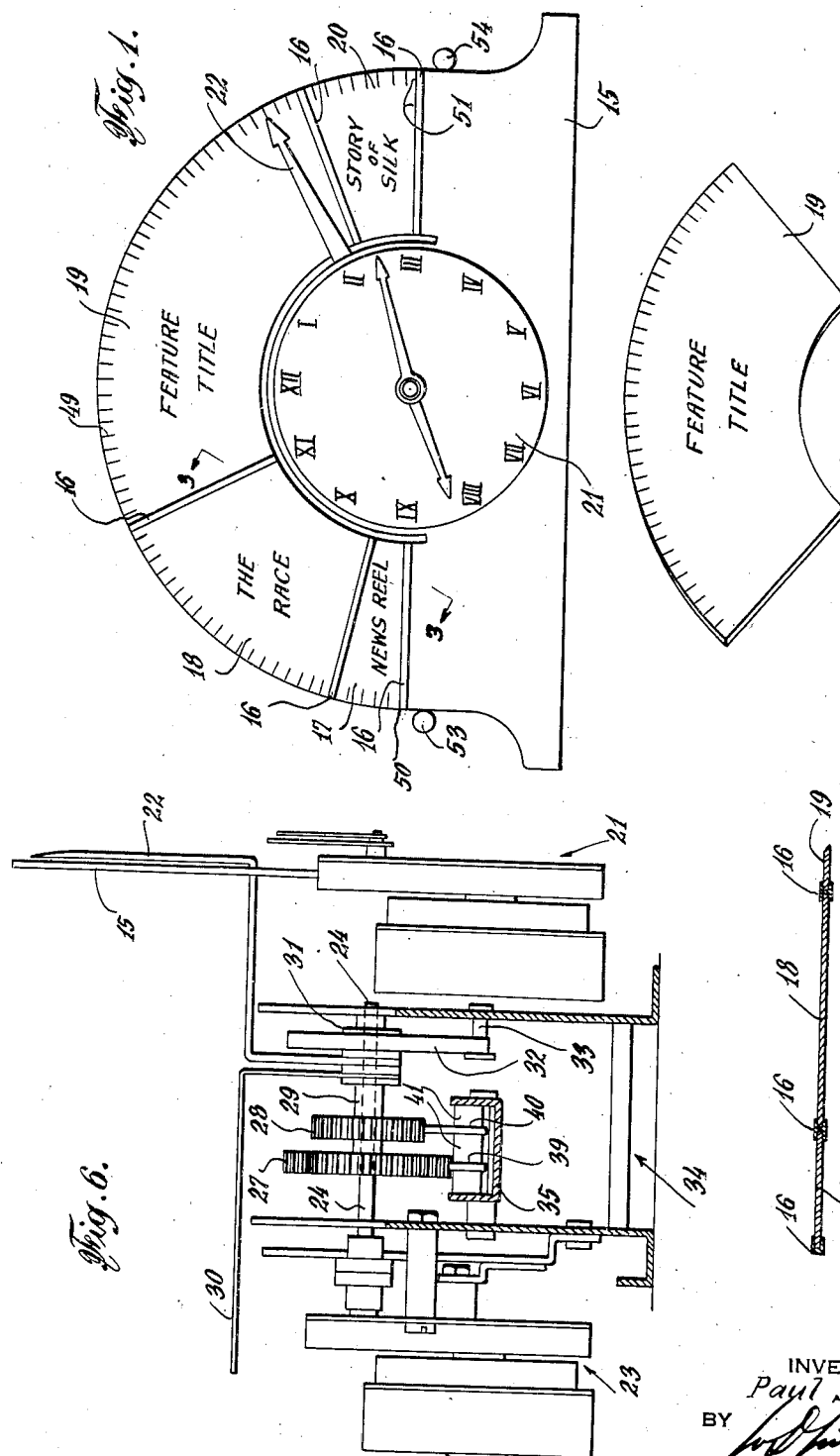

Dec. 9, 1941.  P. SEMEL  2,265,872
REPEATING PROGRAM CLOCK
Filed Feb. 24, 1940  2 Sheets-Sheet 2
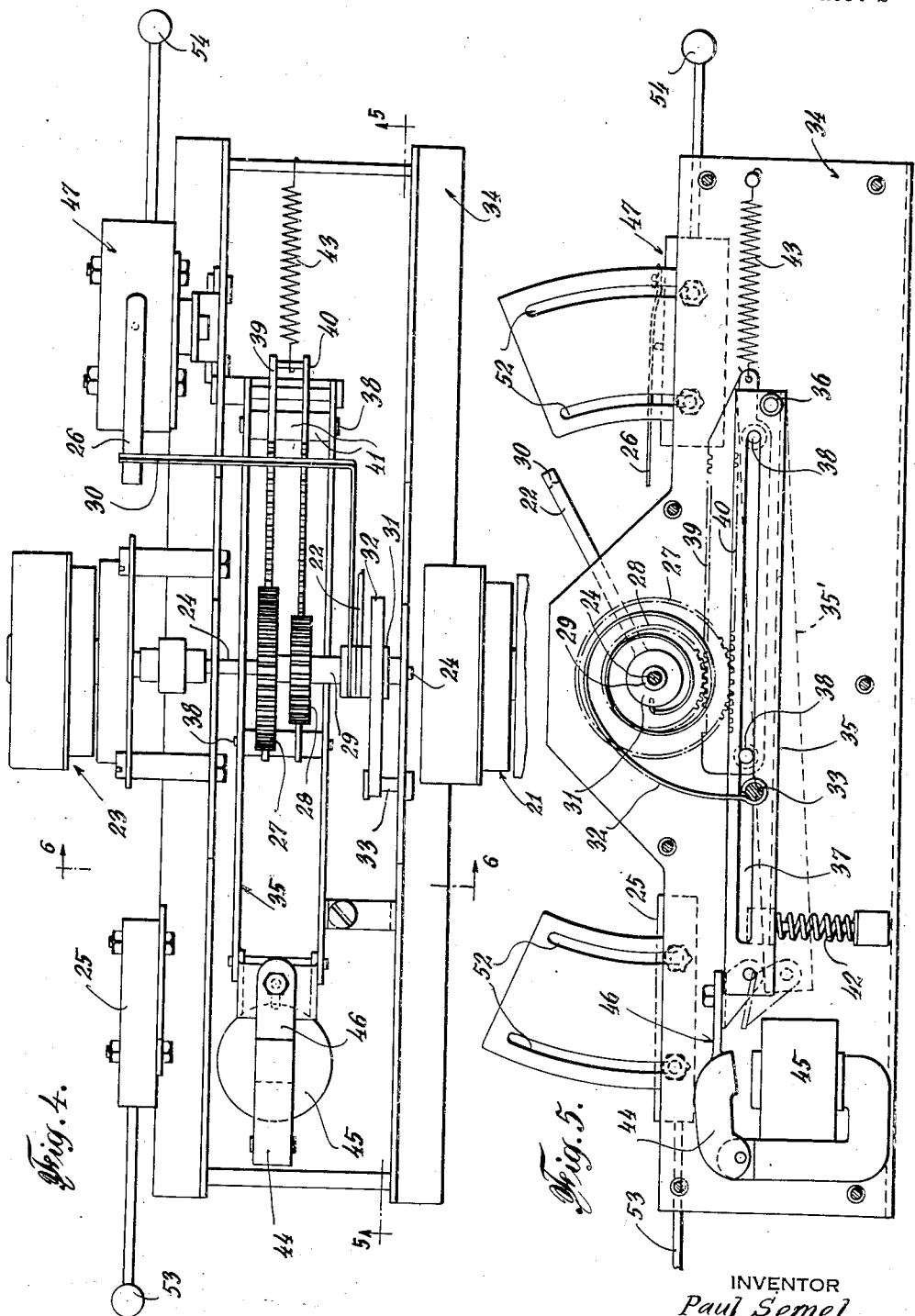
INVENTOR
Paul Semel
BY
ATTORNEY Patented Dec. 9, 1941

2,265,872

UNITED STATES PATENT OFFICE 2,265,872

REPEATING PROGRAM CLOCK

Paul Semel, New York, N. Y.

Application February 24, 1940, Serial No. 320,610

1 Claim. (Cl. 161—15)

My present invention relates to program clocks, and more particularly to the type to be displayed at the entrance or in the lobby of a motion picture house or a theatre, having a definite show or performance which is continuously repeated that day.

An object of this invention is to provide a program indicating device of the type mentioned, of novel and improved construction, adapted to show the progress of the performance or exhibition occurring on the screen or stage, and to indicate that point of the program where the show is at in point of time with respect to the period of the entire program and its component parts.

A further object hereof is to provide a program clock of the character set forth, of novel and improved construction, adapted automatically to repeat its cycle as the show is repeated, and in synchronism therewith.

Another object of this invention is to provide an automatically repeating program clock of the nature described, of novel and improved construction, the period of the cycle of which, is adjustable, in order to accommodate programs of shows requiring different lengths of time to perform or exhibit.

A further object hereof is to provide a novel and improved automatically repeating program clock of the kind mentioned, which is simple to set up, adjust and manipulate, and which is efficient in carrying out the purposes for which it is designed.

Other objects, features and advantages will become manifest as the following disclosure proceeds.

In the accompanying drawings forming part of this application, similar characters of reference indicate corresponding parts in all the views.

Fig. 1 shows the front view of an embodiment of a program progress indicating device, constructed in accordance with the teachings of the present invention.

Fig. 2 shows one of the time graduated, program component indicating cards, a set of which comprise the dial of the contrivance, across the face of which dial, a pointer travels; same being driven by a time controlled means, as for instance a clock mechanism.

Fig. 3 is a section taken at line 3—3 in Fig. 1.

Fig. 4 is a plan view of the pointer operating mechanism included in the embodiment discussed herein.

Fig. 5 is a section taken at line 5—5 in Fig. 4.

Fig. 6 is a section taken at line 6—6 in Fig. 4.

In the drawings, the numeral 15 designates a suitable casing for said embodiment, on the front of which are the radially disposed channel members 16, which preferably are of H cross section to receive the sector shaped cards 17, 18, 19 and 20, on which appear the respective designations of the program components. For instance, for motion picture house purposes, said cards would bear suitable inscription and perhaps illustration or other ornamentation relating to the various pictures constituting the program. It is preferred that said channel members 16 be moveable on the face of the device, and adapted to be secured at any radial position in any suitable manner.

In addition to an ordinary clock of any type as 21, the device includes mechanism for controlling the movement of the pointer 22, the position of which with respect to the cards 17 and the like on the dial, indicates the part of the program at that instant being exhibited on the screen or being otherwise performed in the theatre, at the entrance of which the embodiment herein set forth is mounted, to be readily discernable to persons outside the theatre audience.

The pointer control mechanism, shown particularly in Figs. 4, 5 and 6, is driven by a time controlled means as for instance an electrically operated clock contrivance, which includes what is ordinarily the hour hand shaft 24; said clock means being designated by the numeral 23, a duplicate of which might be suitable to serve for the clock 21. The usual show length being less than four hours duration, I have arbitrarily designed the embodiment explained herein so that the pointer 22 shall travel 180 degrees, that is from the stop member 25, in a clockwise direction to the stop member 26, in four hours, during which time the shaft 24 will have travelled only 120 degrees; the speed of the shaft 24 being one revolution every twelve hours. Of course, the mechanism specifically mentioned is chosen for convenience and not of necessity. It is evident that in the set up illustrated, the ratio of the angular velocity of the pointer 22 to the angular velocity of the shaft 24, should be as three is to two. Such is the ratio of the gears 27 and 28, respectively mounted on shaft 24, and the loose sleeve 29 thereon; said sleeve also carrying thereon the pointer 22, the arm 30 for periodic engagement with the stop members 25 and 26, and a hub 31 to which is fixed an end of a spiral spring 32, the other end of which spring is fixed at 33 to the frame 34.

A channel frame 35, pivotally mounted at 36 onto the frame 34, is provided with the longitudinal slots 37 along its side walls to serve as track means for the pins 38, which maintain as an entity the spaced rack members 39 and 40, with the spacer elements 41; said entity being freely slidable in said frame 35. A compression spring 42, acting against said channel frame or track means 35, is adapted to because of its action, to urge the racks 39 and 40 into engagement with the gears 27 and 28 respectively. A tension spring 43, is adapted to urge the entity including said rack members, to one end of the channel frame 35.

The armature 44 of a solenoid 45, mounted on the frame 34, is connected by a member 46 to the channel frame 35, so that upon actuation of the solenoid 45, said channel frame shall tilt from its normal position, whereby the racks 39 and 40 shall become disengaged from the gears 27 and 28. A switch 47, for controlling the circuit of said solenoid, is mounted on the frame 34, in such position, that arm 30 associated with the pointer 22, will at such time as is the desired end of its movement, move the switch arm 26 to close the solenoid's circuit; said switch arm serving as the finish point stop member. The starting point of the pointer 22, is determined by the stop member 25, which is also in the path of pointer arm 30.

The cards 17 and the like, are respectively of such angular dimension as is determined by the time consumed in the performance or showing of that part of the entire program which they indicate, and each of such cards is graduated as at 49, for instance with five minute interval markings along the path of the tip of the pointer 22. It is evident that the total angular measurement of all the cards, shall equal the total angular movement of the pointer during the time consumed for the performance of the entire program. An observer, will at a glance upon the face of the device as shown in Fig. 1, see just which part of the program is in progress, how long it will yet take before such part is over, and by noting the time of day, for which purpose clock 21 is included, can easily make any desired calculation with respect to the program, as for instance the time when the feature being shown will be over, or when the next full show will commence, or when the next or any part of the program will commence. Stage shows, operas, lectures and vaudeville acts can be likewise dealt with and their progress indicated by the present device.

In operation, at the commencement of the performance of the program, pointer arm 30 is in contact with stop 25, in which position, pointer 22 is at the graduation indicated by the numeral 50 on the dial. Racks 39 and 40 are at one end of their track frame 35, and in engagement with the gears 27 and 28 respectively. The clock mechanisms 21 and 23 are continuously working, and the circuit of the solenoid 45, is open. The revolving gear 27, in engagement with rack 39, will cause both racks 39 and 40 to move along their track 35, during which movement, rack 40 will cause gear 28 to revolve, hence moving the pointer 22 clockwise. During such movement, it is to be noted that springs 32 and 43 are being tensed. In four hours, shaft 24, will have turned a third of a revolution, and sleeve 29, which is the pointer shaft, will have turned a half of a revolution, whereupon the pointer 22, will be at the graduation 51, which indicates the end of a full performance of the program.

At this instance, the pointer arm 30, will move the switch arm 26, closing the circuit and thus actuating the solenoid 45. This will cause armature 44 to move, tilting the frame 35 to 35', whereby the racks 39 and 40, will simultaneously become disengaged from their related gears 27 and 28, and immediately thereupon, the tensed springs 32 and 43, will be free to act, and at this time will restore the pointer 22, and the entity including the rack members 39 and 40, to their initial starting points respectively, with pointer arm 30 up against and stopped in its return movement by the initial stop member 25, and the pointer 22 proper, will indicate at point 50 on the dial. To permit sufficient time interval, though short, in order that the springs 32 and 43 shall fully accomplish their intended function, I have selected solenoid 45 of the type having the characteristic that its armature 44 is retarded in its return movement to normal rest position after the solenoid's circuit is open. Upon return of the armature 44 to its open circuit normal rest position, the frame 35 will be tilted back to its original position where the racks 39 and 40 again engage their related gears 27 and 28. The solenoid's circuit, of course is opened, as soon as arm 30 is moved away from the switch arm 26, as caused by the return action of the spiral spring 32. The device now repeats its cycle of operation as described, and is in synchronism with the progress of the program being performed or exhibited in the theatre.

The position of the stop members 25 and 26, or of either of them may be altered, to accommodate the device to indicate the progress of a program requiring less time than illustrated herein. Hence, member 25, and the switch 47, are adapted to be set nearer to one another, so that the cycle of operation of the device will likewise be shortened. Such adjustment is permitted by shifting said stop members along the slots 52, which may be aided by means of the handle members 53 and 54; the former extending from the stop member 25, and the latter from the switch casing 47, and accessible from in front of the device. It is also advisable that the pointer 22, be frictionally mounted onto its sleeve shaft 29, so that said pointer might be manually shifted a little to restore the required synchronism in action mentioned, should there occur any discrepancy, or, in the event it is desired to eliminate the performance of one of the features of the program, in which event said pointer 22 could be manually moved to that point on the dial which indicates the commencement of the feature actually in progress instead of the one omitted.

The present invention is capable of numerous forms and various adaptations without departing from the essential features herein taught. It is therefore intended and desired that the specific embodiment herein described shall be deemed illustrative and not restrictive, and that the patent shall cover all patentable novelty herein disclosed; reference being had to the following claim rather than to the specific illustration herein, to indicate the scope of this invention.

I claim:

In a program progress indicator, the combination of a dial of a form of less than 360 degrees; said dial being divided into sectors showing thereon the designations of the parts of the program; said sectors being arranged in sequence of the intended performance of the program and said sectors being of relative dimension proportional to the time intervals required for the performance of the respective parts of the program indicated thereon, and graduated as to such time intervals, a shaft, a pointer extending from said shaft, adapted to traverse the dial, a pair of stops adapted to determine the range of travel of the pointer, a time controlled shaft adapted for continuous movement, a pair of gears of different sizes mounted one on each of the shafts; said shafts being parallel, a moveable frame, a rack means engaging both gears, slidably mounted in said frame; said rack means being adapted to become disengaged from said gears upon movement of said frame, means to move the frame out of and back to its normal position during a short interval of time, adapted to become actuated when the pointer reaches one of the stop members, means to shift the rack means towards one end of the frame and means to shift the pointer to the other stop member; both said shifting means being adapted to become actuated during the continuance of said short interval of time, whereby at the end of said interval, the pointer will commence repetition of its first mentioned movement with respect to the dial.

PAUL SEMEL.